E. H. SNYDER.
PROCESS OF TREATING ORES.
APPLICATION FILED MAR. 31, 1915.
1,184,585.
Patented May 23, 1916.
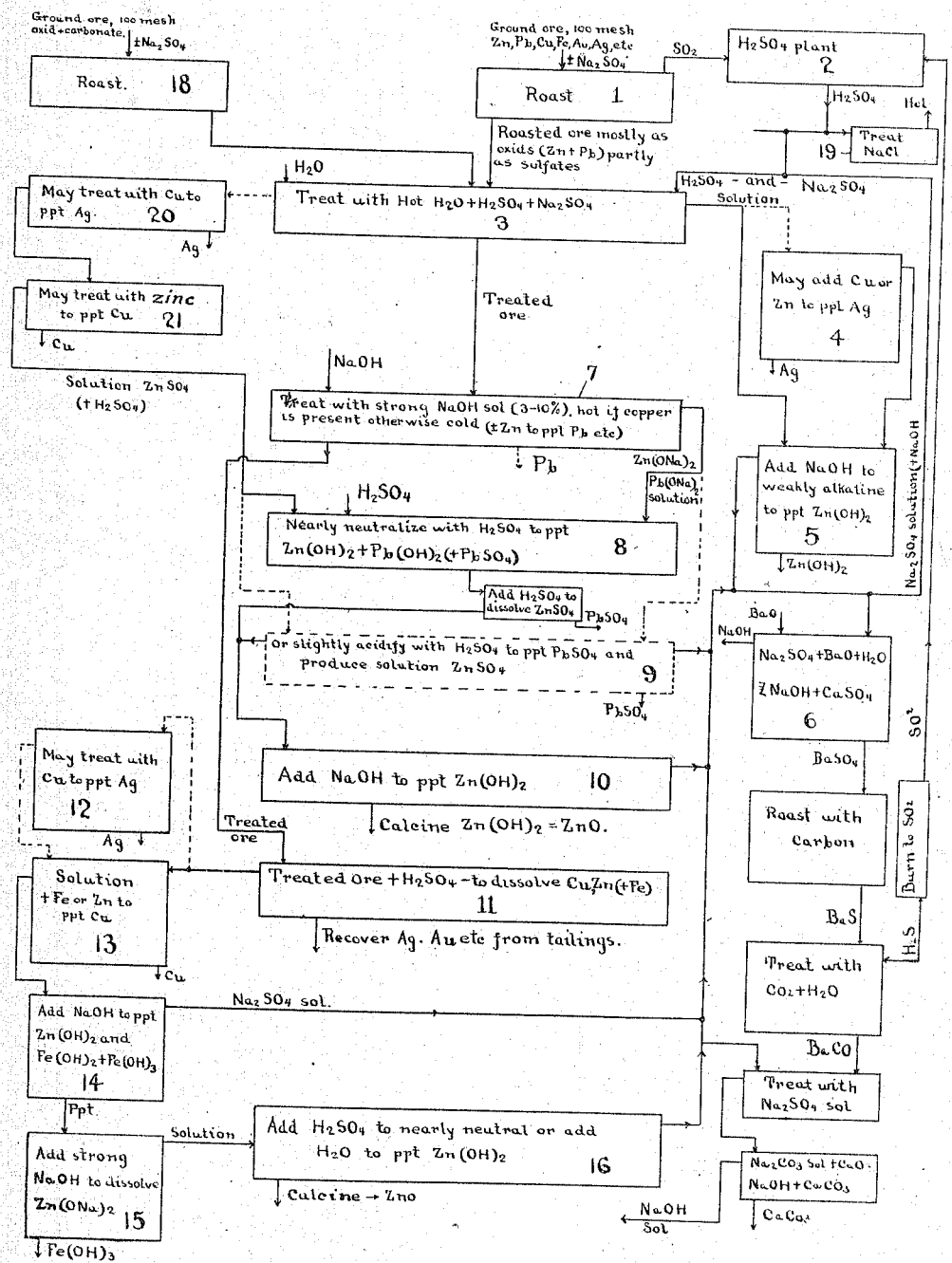

UNITED STATES PATENT OFFICE.

EDWARD HARRISON SNYDER, OF PIOCHE, NEVADA.

PROCESS OF TREATING ORES.

1,184,585.  Specification of Letters Patent.  Patented May 23, 1916.

Application filed March 31, 1915. Serial No. 18,355.

*To all whom it may concern:*

Be it known that I, EDWARD H. SNYDER, a citizen of the United States, residing at Pioche, in the county of Lincoln and State of Nevada, have invented new and useful Improvements in Processes of Treating Ores, of which the following is a specification.

The present invention relates to the treatment of complex ores, such as ores containing zinc and lead, with or without other metals, such as copper, iron, silver, gold or others, and is applicable whether the metals exist in the ore principally as sulfids, or principally in other forms, such as oxid or carbonate, or mixtures thereof.

Assuming that the ore being treated is an ore in which sulfids predominate, the ore is first ground, preferably to pass a one hundred mesh sieve, and is then roasted in order to convert the metals into oxid, and to drive off the sulfur in the form of sulfur dioxid which may be converted into sulfuric acid for use in the process, in any suitable manner.

In the treatment of certain classes of ore, it is advisable before grinding to add a small amount of sodium sulfate, or other alkali metal sulfate before roasting, otherwise a portion of the z will not be "leachable."

The accompanying drawing shows a diagram of the process, and is not intended to illustrate any particular apparatus used in carrying out the process.

In said drawing, 1 represents the step of roasting the ore, and 2 the sulfuric acid plant.

The roasted ore is carried to a suitable vat illustrated at 3, in which it is treated with a solution containing sodium sulfate, a small amount of sulfuric acid, and a considerable amount of water, the treatment being effected in a heated condition. The solution may be passed through a tank 4 containing suspended pieces of copper or zinc, to precipitate the silver, which is thereby removed from the solution and recovered. The liquid then passes to tank 5, in which it is treated with caustic soda solution, in slight excess only, in order to precipitate zinc hydroxid, which if substantially free from iron and copper may be calcined and sold as zinc oxid, or if this zinc hydroxid contains a considerable amount of iron or copper, it may be purified as hereinafter described. The waste liquor, which consists essentially of a solution of sodium sulfate may be returned to treating vat 3, and this cycle of operations may be repeated until the solution accumulates a considerable amount of sodium sulfate, when it will be transferred to the vat 6, and treated with either barium or strontium hydroxid to produce caustic soda which may be used in the various steps of the process. The alkaline earth sulfate obtained here is then roasted with carbon and converted into sulfid. This sulfid is dissolved in a small amount of water and the solution treated with waste gases, from the various furnaces, containing carbon dioxid. By this means the alkaline earth sulfid is changed to carbonate and the hydrogen sulfid formed at the same time can be saved, and used for making sulfur dioxid for the sulfuric acid plant. The alkaline earth carbonate is separated from the solution and taken to a suitable furnace and calcined to produce alkaline earth oxid for use in vat 6. When barium is the alkaline earth used, the fine precipitated carbonate from the above operation is agitated with a hot solution of sodium sulfate, thereby changing the barium carbonate to barium sulfate, and at the same time producing sodium carbonate in solution, which is filtered off and treated with quick lime to form sodium hydroxid.

The ore from the vat 3 is conveyed to the vat 7, wherein it is treated with a strong solution of caustic soda, say three to ten per cent. strength, which solution will be maintained near the boiling point, if the ore contains copper, in order to prevent the copper from entering the solution. If the ore is substantially free from copper, the solution will preferably be employed cold, since zinc will be less soluble in the liquor if hot, than if cold. In this vat, I may also employ zinc plates, to precipitate any dissolved lead, (which would be in the form of sodium plumbate), thereby removing the lead from the solution, and also recovering the lead in metallic form as a product.

The solution containing sodium zincate, caustic soda and usually also sodium plumbate, is conveyed to the tank 8, wherein it is partly neutralized with sulfuric acid, leaving the solution slightly alkaline. In this treatment, zinc hydroxid, lead hydroxid and lead sulfate will be precipitated, which may be purified and separated as described below. Liquor from tank 21 may be first added.

As an alternative step at this point, I can convey the solution from the tank 7 into the tank 9, where the solution will be slightly acidified with sulfuric acid to precipitate all lead as sulfate, and to form zinc sulfate solution. The zinc sulfate solution will be conveyed to the tank 10 and may be made slightly alkaline with caustic soda to precipitate zinc hydroxid. This zinc hydroxid will ordinarily be pure, and can be calcined directly to form zinc oxid. If desired, and if the zinc hydroxid be not sufficiently pure, it can be first purified as described below.

The ore from the alkaline treatment in tank 7 is conveyed to the tank 11, where it is treated with sulfuric acid in excess, to dissolve zinc, copper, and some iron. The liquor from this treatment may be conveyed to the tank 12, where it is treated with copper to precipitate any silver which may be dissolved in the treatment in tank 11, after which it is conveyed to the tank 13 (or the liquor may be conveyed directly from tank 11 to tank 13, in case it does not contain any material amounts of silver). In the tank 13 the solution is treated with iron or zinc to precipitate the copper, which is thereby recovered. The solution from tank 13 is conveyed to the tank 14, where it is treated with caustic soda in slight excess, to precipitate zinc hydroxid and iron hydroxid. The residue from tank 14 being impure (and also the zinc hydroxid obtained in certain of the previous steps, if impure) will be conveyed to tank 15, where it is treated with strong caustic soda to dissolve the zinc as sodium zincate, and the iron hydroxid remains undissolved and is thereby separated from the zinc. The solution of sodium zincate from tank 15 will be conveyed to tank 16, where it is treated with sulfuric acid, nearly to neutralization, or is diluted with water, either of which will cause the precipitation of zinc hydroxid in a pure condition, which may be calcined to produce zinc oxid.

The sodium sulfate solutions from tanks 10, 14, and 16, may be conveyed to the tank 6, for causticization.

The liquors from tank 3 (produced by the leaching of the roasted ore with sodium sulfate, sulfuric acid and water, as above more fully described) may contain more or less silver, in which case they may be treated in tank 20 with copper or other metal more electro-positive than silver, to precipitate the silver in a metallic condition, and they may then be treated with zinc, or other metal more electro-positive than copper, in tank 21, to precipitate copper, after which said liquors will be conveyed to the tank 8, or to the tank 9.

In case the ore does not contain any considerable amounts of sulfid, it will preferably be ground and mixed with sodium sulfate and roasted in the roaster 18, and then conveyed to tank 3, where it is treated in substantially the same manner as above specified.

In order to make up for the loss of sodium sulfate, a small amount of the sulfuric acid will preferably be used for the treatment of sodium chlorid in the sulfate furnace 19, thereby producing hydrochloric acid as a by-product and producing sodium sulfate which may be used in the roasting operation, mixed with the ore, or may be used in any of the steps in which sodium sulfate is employed.

Sulfuric acid from the plant 2 is used in the various operations in tanks 3, 8, 9, 11 and 16.

While I have referred throughout the specification to the use of sodium sulfate and caustic soda as the reagents to be employed, I will state that any other alkali sulfate and caustic alkali may be used, such as potassium sulfate and caustic potash.

I desire to call attention to the fact that the ore after treatment with acid is more readily attacked by alkaline solutions than would be the ore before such treatment with acid. I also desire to call attention to the fact that the ore after the treatment with alkali is more readily attacked by acids than before the treatment.

It is to be noted that zinc is soluble either in a strong alkali or in an acid; lead hydroxid is soluble in a strong alkali, but is not readily soluble in sulfuric acid of low concentration, since lead sulfate is precipitated from its solution in concentrated sulfuric acid, either by dilution, or by neutralizing the acid.

Copper is soluble in acid solutions, but not to any considerable extent in hot alkaline solutions. Metallic copper will precipitate metallic silver from solutions containing silver sulfate. Metallic zinc will precipitate either lead, copper or silver from its solutions. Metallic iron will precipitate either silver or copper from its solutions.

While I have described the particular treatments of the various liquors, I do not limit myself to these exact treatments, since other methods of precipitating the metals from solutions, in some cases, may be employed.

While I have described a particular method of purifying the zinc hydroxid, I do not desire to limit myself to this particular method, since other methods of accomplishing this result may be employed.

The residual ore after leaving the tank 11 may still contain a considerable amount of the silver originally contained in this ore, and also will contain substantially all of the gold originally contained in the ore. These metals may be recovered from the ore in any suitable manner.

The mixture of lead sulfate, lead hydroxid and zinc hydroxid from tank 8, may be treated with $H_2SO_4$, to precipitate lead sulfate and dissolve the zinc as sulfate, this zinc sulfate solution being passed to tank 10.

Having thus fully described my invention, what I claim as new and desire to secure by Letters Patent, is:—

1. A process of treating oxidized ores containing lead, zinc and other metals, which comprises leaching the oxidized ore with a hot liquid containing an alkali sulfate, and containing sulfuric acid in amount sufficient to dissolve a part only of the zinc contained in said ore, separating the resulting liquid from the ore, and rendering the same slightly alkaline to precipitate zinc hydroxid, treating the digested ore with a strong solution of caustic alkali to extract a further amount of zinc from the ore, and adding to the liquor thereby produced, an acid in amount at least nearly equivalent to the alkali present in said solution, to precipitate lead therefrom.

2. A process of extracting lead and zinc from ores containing these and other metals which comprises first roasting the ore, treating the same with a hot liquor containing a relatively small amount of a free sulfuric acid and containing an alkali sulfate, treating the liquor thereby obtained with a metal to precipitate metallic silver, treating the resulting liquid with caustic alkali to precipitate zinc hydroxid, adding the resulting liquid to sulfuric acid, for again extracting roasted ore, and repeating this cycle of operations until a solution containing considerable amounts of alkali sulfate is produced, and then causticizing said alkali sulfate solution.

3. A process of extracting values from complex sulfid ores, which comprises roasting the crushed ores with an alkali sulfate; leaching the roasted ores with a liquid containing sulfuric acid and alkali sulfate; treating the liquid thereby produced with a metal to precipitate silver, and thereafter with an alkali to precipitate zinc, treating the partly extracted ore with a strong solution of caustic alkali, and recovering zinc and lead from said liquor, further treating the ores with sulfuric acid to dissolve copper and zinc, precipitating copper from said solution by treatment with a metal more electro-positive than copper, precipitating zinc hydroxid from said liquor, purifying the same, and calcining to produce zinc oxid.

4. A process of treating complex ores which comprises roasting said ores with small amounts of an alkali sulfate to produce oxidized ores, treating said ores with a liquor containing sulfuric acid, and separating the solution therefrom, then treating said ores with a solution containing a considerable amount of caustic alkali, and separating said liquor therefrom, then treating said ores with a liquor containing sulfuric acid, and separating said liquor therefrom, and recovering the metals extracted by each of said liquors.

5. A process of separating metals from complex sulfid ores, which comprises roasting said ores with a small amount of a flux, oxidizing the $SO_2$ given off to sulfuric acid, leaching the roasted ores with a hot liquor containing sulfuric acid and an alkali sulfate, precipitating silver from the solution by treating the same with a metal, treating the resulting liquor with caustic alkali in slight excess to precipitate zinc, treating the residual ores with strong caustic alkali solution to dissolve a portion of the zinc, and substantially all the lead, slightly acidulating the solution with sulfuric acid to precipitate lead sulfate, and treating the remaining solution with caustic alkali to precipitate zinc, further extracting the ores with sulfuric acid to dissolve copper and zinc, treating the liquor thus produced with zinc to precipitate copper, adding caustic alkali to the remaining liquor to precipitate zinc and iron hydroxids, dissolving the zinc hydroxid in caustic alkali, and reprecipitating the zinc hydroxid by reducing the acid concentration.

6. A process of treating complex ores which comprises roasting the ore, leaching with a solution containing a relatively small amount of free sulfuric acid, leaching with a solution containing caustic alkali, again leaching with sulfuric acid of a strength considerably greater than that employed in the first leaching step, and recovering metal values from the three liquors.

7. A process of treating complex ores which comprises roasting the ore with a small amount of an alkali sulfate, leaching the ore with a weakly acid solution, leaching the ore with an alkaline solution, again leaching the ore with an acid solution of materially greater acidity than that employed in the first leaching step, and recovering metal values from the three liquors.

8. A process of treating complex ores which comprises roasting the ores, treating with a liquor containing a relatively small amount of sulfuric acid to extract zinc from the ore, and recovering zinc from the leaching solution; treating the residual ore with a solution of caustic soda to dissolve a further amount of zinc, and recovering zinc from the leaching solution; treating the twice leached ore with sulfuric acid of a strength greater than that employed in the first leaching step, to dissolve a further amount of zinc from the ore, and recovering the zinc from the leaching solution.

In testimony whereof I have hereunto set my hand in presence of two subscribing witnesses.

EDWARD HARRISON SNYDER.

Witnesses:
C. W. GARRISON,
W. W. STOCKHAM.